United States Patent
Rogols et al.

(10) Patent No.: US 6,524,639 B1
(45) Date of Patent: Feb. 25, 2003

(54) COMPOSITE FOOD PRODUCT COMPRISING POTATO PEEL PRODUCT

(76) Inventors: Saul Rogols, 23573 Pondview Pl., Golden, CO (US) 80401; Denise M. Sirovatka, 3360 W. 33rd Ave., Denver, CO (US) 80211; Robert G. Widmaier, 20123-186th Pl. NE., Woodinville, WA (US) 98072

( * ) Notice: Subject to any disclaimer, the term of this patent is extended or adjusted under 35 U.S.C. 154(b) by 0 days.

(21) Appl. No.: 10/184,247

(22) Filed: Jun. 27, 2002

Related U.S. Application Data

(62) Division of application No. 09/536,575, filed on Mar. 28, 2000, now Pat. No. 6,440,204.
(60) Provisional application No. 60/127,146, filed on Mar. 31, 1999.

(51) Int. Cl.[7] ............... C09D 189/04; C09D 103/00; A23L 1/0522; A23L 1/0528; A23L 1/31
(52) U.S. Cl. ............... 426/637; 426/465; 426/550; 426/578; 426/661; 426/804; 106/128.1; 106/134.1
(58) Field of Search ............ 106/128.1, 134.1; 426/465, 550, 578, 637, 661, 804

(56) References Cited

U.S. PATENT DOCUMENTS

| | | | |
|---|---|---|---|
| 4,357,194 A | 11/1982 | Stofko | |
| 4,359,341 A | 11/1982 | Allen | |
| 4,587,332 A | 5/1986 | Lane et al. | |
| 4,627,951 A | 12/1986 | Shen | |
| 4,992,519 A | 2/1991 | Mukherjee | |
| 5,205,863 A | * 4/1993 | Elion | ............ 106/126.3 |
| 5,385,764 A | 1/1995 | Andersen et al. | |
| 5,545,450 A | 8/1996 | Andersen et al. | |
| 5,662,731 A | 9/1997 | Andersen et al. | |
| 5,665,439 A | 9/1997 | Andersen et al. | |
| 5,679,145 A | 10/1997 | Andersen et al. | |
| 5,702,787 A | 12/1997 | Andersen et al. | |
| 5,800,647 A | 9/1998 | Andersen et al. | |
| 5,891,496 A | 4/1999 | Hannah et al. | |
| 6,440,204 B1 | * 8/2002 | Rogols et al. | ............ 106/128.1 |
| 6,451,370 B1 | * 9/2002 | Anderson | ............ 426/635 |

FOREIGN PATENT DOCUMENTS

| | | |
|---|---|---|
| CA | 2237745 | 5/1998 |
| DE | 3933279 | 7/1990 |
| DE | 4020969 | 7/1991 |
| EP | 0 732 386 | 9/1996 |
| FR | 2 222 027 | 3/1974 |
| JP | 10-81761 | 3/1998 |
| NL | 9002898 | 7/1992 |
| WO | WO 91/05020 | 4/1991 |

OTHER PUBLICATIONS

Mayer et al., "Potato Pulp: Microbiological Characterization, Physical Modification, and Application of this Agricultural Waste Product," Appl. Microbiol. Biotechnol., 48:435–440 (1997). No month provided.

Mayer et al., "Potato Pulp: Properties, Physical Modification and Applications," Polymer Degradation and Stability, 59:231–235 (1998). No month provided.

Orts et al., "Preventing Soil Erosion with Polymer Additives," Polymer News, 24:406–413 (1999). No month provided.

European Search Report, European Patent Office, European application No. 00921472.7. No date provided.

* cited by examiner

*Primary Examiner*—David Brunsman
(74) *Attorney, Agent, or Firm*—Marshall, Gerstein & Borun

(57) ABSTRACT

The present invention provides adhesive and binder compositions comprising a potato peel product characterized on a dry solids basis by at least 30% starch, at least 5% protein and at least 2% fibers.

8 Claims, 1 Drawing Sheet

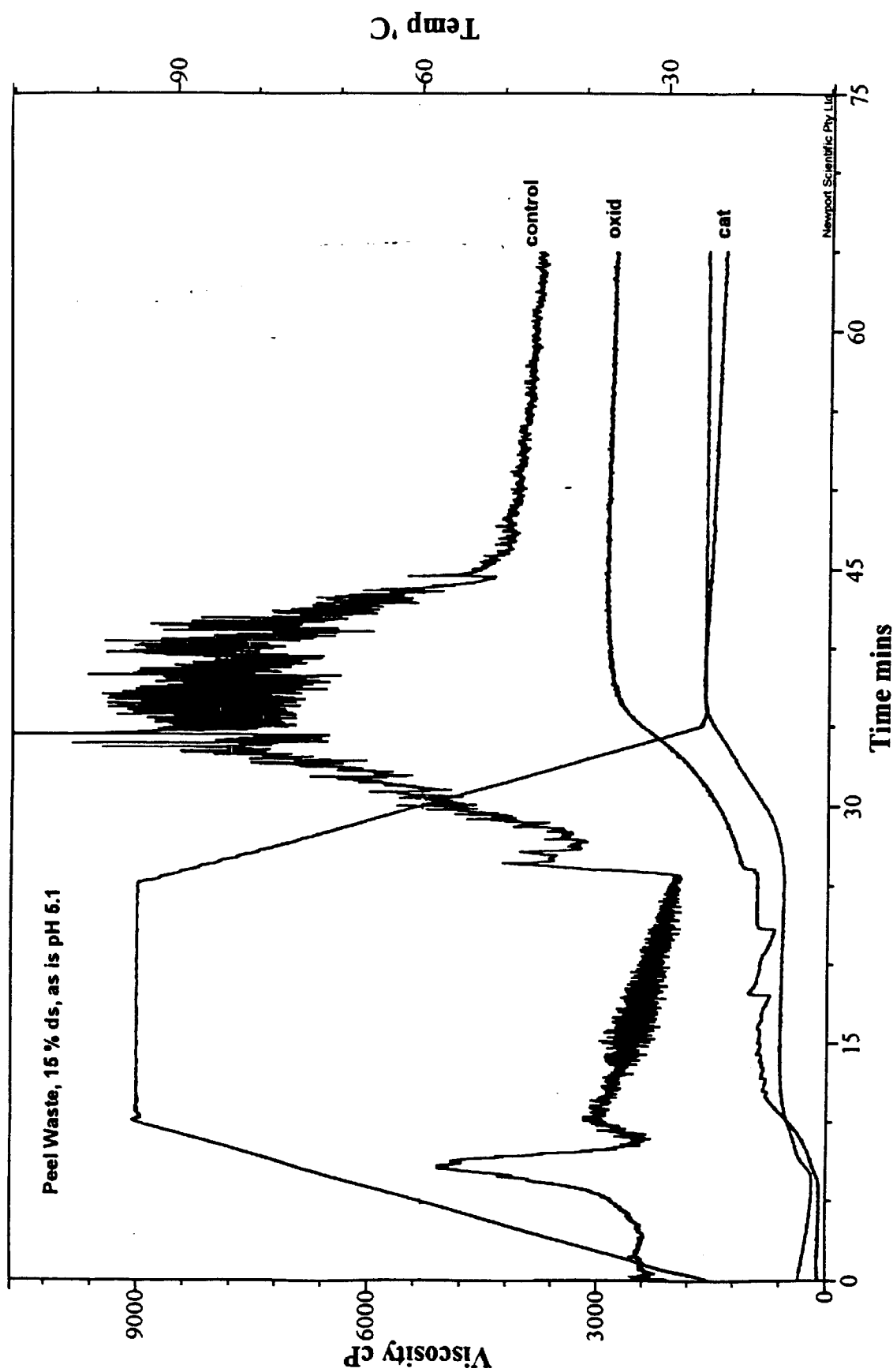

COMPOSITE FOOD PRODUCT COMPRISING POTATO PEEL PRODUCT

This is a division of U.S. patent application Ser. No. 09/536,575 filed Mar. 28, 2000 now U.S. Pat. No. 6,440,204 which claims benefit of U.S. Provisional Application Ser. No. 60/127,146 filed Mar. 31, 1999, the disclosures of which are hereby incorporated herein by reference.

BACKGROUND TO THE INVENTION

The present invention relates to natural materials which can be used as adhesives and binders. Natural carbohydrate and protein materials are used as binders and adhesives in a variety of applications. Carbohydrate materials, and in particular starches, are well known for use as components of adhesive compositions such as corrugating adhesives for paper and paperboard. A particularly useful corrugating adhesive comprises starch which is cooked in the presence of borax and caustic.

Starches are also used as binders in the paper industry in applications such as binders for light weight coatings. Cationic starches are also known to be useful as wet-end adhesives in paper manufacture. In addition, starch is known for use as a component in composite compositions such as those of Anderson et al., U.S. Pat. No. 5,385,764 and Anderson et al., U.S. Pat. No. 5.545,450 which comprise combinations of starch, fiber an dicalcium carbonate or other minerals.

Gums including alginates, gellan, locust bean and xanthan gum are known to provide particularly useful adhesive and binding properties at low concentrations when used in a variety of applications. Gums are particularly useful as binders in food compositions and particularly in composite food compositions.

Proteins provide excellent performance as adhesives and as binders in a number of applications but are reserved for use in certain specialized applications because they are generally more expensive than starches. Typical protein adhesives and glues include animal glues produced from collagen found in animal skin, connective tissue and bone. Fish glues made from the skin of fish such as cod also comprise collagen but with a lower molecular weight than other animal collagen. Casein protein is particularly useful in glues and in coatings for paperboard, plywood, door and furniture assembly because of the high adhesive strength which it provides. Glues produced from soy protein are useful as interior plywood glues, laminating glue for wood, door assembly, furniture assembly and other wood bonding applications. Blood proteins derived as byproducts of the meat industry also provide excellent adhesive properties and are used as adhesives in the manufacture of plywood and as bonding materials in sea foods such as surimi.

Potato plant tubers referred to herein as potatoes comprise several structures. Of these structures, the following make up the core from the center of the potato out: the pith, the vascular storage area, the vascular ring, followed by the so-called peel portion which consists of a cortex and a periderm. Approximate analysis of the entire white potato indicates about 77% water and solids of about 23%. Of the solids percentage, roughly 15% is starch and 2% is protein. The protein is located between the cortex and the periderm peel layer. In the processing of potatoes for food or industrial uses it is frequently desired to separate the potato peel from the heart of the potato, in order to make use of the substantially pure starch. The starch may be partially or completely gelatinized such that the peel is only weakly bound to the heart of the potato. Potato peel waste is thus produced as a byproduct in the processing of potatoes for food uses such as the manufacture of french fries, potato chips and in the processing of potatoes for industrial uses.

According to one method of processing potatoes to remove the potato skin, steam is directed against the exterior of potatoes such that the layer of starch immediately adjacent the potato peel is partially or completely gelatinized. The potato is then subjected to mechanical processing such that the peel with a layer of partially or completely gelatinized starch is separated from the heart of the potato which is then subjected to further processing. The resulting potato peel product comprises mostly water with the balance made up of gelatinized and ungelatinized starch, protein, fiber and ash. Prior to its disposal or other use the potato peel product is frequently combined with other waste streams containing byproducts of potato processing. Such streams of what is sometimes known as potato "trim waste" contain potato trimmings and other byproducts of potato production. As such, the trim waste typically comprises relatively higher levels of starch (and where fryer waste from french fry production is combined, fat) and relatively lower levels of protein and fiber than does peel waste.

Whether or not the potato peel product includes potato trim waste, the potato peel waste product has little commercial value because it comprises a heterologous mixture of water, protein, fiber and starch. As a result potato peel products are usually disposed of as waste or are used as a liquid supplement to animal feed. Because the potato peel product can be costly to dispose of as waste and is expensive to transport and provides only marginal economic value when used as animal feed, there remains a desire in the art for new applications for potato peel products.

SUMMARY OF THE INVENTION

The present invention is based on the discovery that potato peel products such as derived from potato peel waste or potato peel waste in combination with potato trim waste are characterized by particularly useful properties as adhesives and binders in a variety of industrial and food product uses. Other uses for the potato peel products of the invention include use in oil well drilling mud, soy based adhesive coatings used in coated fine paper and in wet-end papermaking applications to increase bonding in brown paperboard. Potato peel products useful according to the invention can be derived in any of a variety of manners but are preferably potato peel waste such as produced by steam peeling potatoes. Alternatively, potato peel products useful according to the invention can be potato peel waste combined with potato trim waste and other materials.

While starches and certain proteins are known to be useful as adhesives and binders in various applications it has been found that the specific combination of gelatinized starch, ungelatinized starch, protein and fiber making up potato peel waste is characterized by particularly useful adhesive and binding properties. This is particularly the case when the potato peel products comprise potato starch which has not been completely gelatinized and those products are heated under conditions selected to complete gelatinization of the starch during setting of the adhesive or binder material.

Among other uses, the potato peel products of the invention may be used as adhesives and as binders in edible and non-edible composite materials. According to one aspect of the invention a non-edible composite material is provided which comprises a non-edible substrate and a binder wherein said binder comprises a potato peel product characterized on a dry solids basis by at least 30% starch, at least 5% protein and at least 2% fiber. Preferred potato peel products according to the invention comprise greater than 40%, more preferably greater than 50% and most preferably 55% to 65% starch on a dry solids basis; and from 2% to 20% fiber with 4% to 20% being preferred. Protein is preferably present at dry solids levels of from 5% to 30% with concentrations of 10% to 25% being particularly preferred.

Non-edible composite materials of the invention can comprise non-edible substrate materials including but not limited to mineral particles such as calcium carbonate, wood particles and fiber and paper fiber. Representative composite materials using potato peel products as binders according to the invention include materials such as gypsum wall board, acoustical tile, particle board and packaging materials.

The invention also provides a method of producing a non-edible composite material comprising a substrate and a binder wherein said binder comprises a potato peel product characterized on a dry solids basis by at least 30% starch wherein said starch is not completely gelatinized, at least 5% protein and at least 2% fiber to form a mixture; and heating said mixture under conditions selected to complete gelatinization of said starch.

Also provided by the invention are adhesive compositions comprising a potato peel product. One particularly preferred adhesive is that comprising a potato peel product characterized on a dry solids basis by at least 30% starch, at least 5% protein and at least 2% fiber which has been treated with borax and caustic.

The adhesive compositions of the invention are particularly useful for adhering paper or paperboard as corrugating and paper adhesives and also as labeling adhesives. According to one aspect of the invention the use of the potato peel products of the invention provide improvements in the printability of coated paper box and board containers. As corrugating adhesives the compositions of the invention provide particularly good properties for adhesion of both coated (including lightweight coated) and uncoated papers. The adhesives of the invention are also useful as architectural adhesives for use as wallpaper, tiling and paneling adhesives and are also particularly useful as adhesives in the production of architectural laminates including but not limited to plywood.

The potato peel products of the invention are also useful as binders in composite food products comprising an edible substrate and a binder. Suitable composite food products which can be produced according to the invention include meat analogs such as vegetable burger patties which can comprise soy protein as the substrate. Other composite food products which can comprise the potato peel products of the invention as binders include vegetable analogs and composite meat products including such products as sausage and surimi. Another food application is the binding of fat and water together in meat based sauces such as those used in Mexican and Italian cuisine.

The potato peel products of the invention can also be used in agriculture as soil binders to prevent silt migration in irrigated fanning. Such binders would be superior to polyacrylamide flocculated currently used in such applications because of environmental concerns regarding the use of synthetic polymers. As such, the potato peel products of the invention may be added at concentrations of from 5 to 1000 ppm to irrigation water to prevent silt migration.

The potato peel products of the invention can also be used as binders in industrial applications such as in paper manufacture by being derivatized with a cationic substituent and used as a wet-end binder in paper manufacture. For this, suitable cationic derivatives include quaternary ammonium compounds can be used to derivatize the potato peel product according to methods known to the art.

Preferred levels of substitution with cationic reagents range from about 0.2 to about 2.0 cationic groups per anhydroglucose unit depending upon the intended application for the derivatized potato peel product with actual cationic substitution levels being less than those applied.

The potato peel products of the invention may also be derivatized with anionic substituents such as by oxidation with 0.9% chlorine based on a dry starch weight. Moreover, amphoteric potato peel products can be produced by a combination of cationic and anionic substitution. According to a further embodiment of the invention, charged coatings can be applied electrostatically by a dry coater apparatus.

Other preferred potato peel materials of the invention include potato peel waste which has been subjected to an oxidation reaction and is useful for increased adhesiveness. It is further contemplated that potato peel waste that has been subjected to a cross linking reaction with cross linking agents such as phosphorus oxychloride will exhibit useful properties as adhesives and wet end strength additives in the manufacture of paper.

In addition a potato peel product which has been treated with caustic demonstrates particularly good stability properties when stored for prolonged periods. Caustic addition can vary between 0.7% and 4% of peel waste with a pH measurement higher than 11 being preferred.

Other potato peel products which are useful according to the invention are those which are chemically modified by any of a variety of procedures which modify and improve the binding and adhesive properties of the product. Suitable chemical modifications include chemical derivatization including but not limited to oxidation, chemical crosslinking, anionic substitution, cationic substitution, modification by hydroxy-alkyl substitution and the like. While such chemical derivatization is expected to have its most significant effects on the starch content of the potato peel product it is also expected to have effects on the protein and fiber components of the potato peel products. Other chemical modifications of the potato peel product of the invention include hydrolytic modification of the potato peel product by acid or enzyme hydrolysis of the starch and other carbohydrate content of the product. It is further contemplated that the products can be subjected to enzymatic hydrolysis of the protein content by treatment with proteases.

Other potato peel products of the invention include those which are subjected to physical grinding to produce a particulate matter characterized by a particle size wherein 100% passes through a U.S. Standard No. 60 sieve.

BRIEF DESCRIPTION OF THE DRAWING

FIG. 1 depicts the RVA viscosities of oxidized and cationic potato peel products compared with an unmodified potato peel product (control) of the invention.

DETAILED DESCRIPTION

Potato peel products of the invention may be used as adhesives and binders in a variety of different applications. Suitable industrial applications include as binders in non-edible composite materials comprising mineral or vegetable particles as substrates. Such products include gypsum wall board, acoustical tile, paper manufacture and particle board. The potato peel products may also be used as adhesives in industrial uses such as paper and paperboard adhesives and architectural adhesives. In addition, the potato peel products may be used as binders in composite food products comprising edible substrates, and are particularly useful in binding fat and water to the meat component of the food product.

The potato peel products of the present invention are characterized by a minimum content (on a dry solids weight basis) of at least 30% starch, at least 5% protein and at least 2% fiber. It is preferred that the starch component of the potato peel product not be completely gelatinized prior to its end use as a binder in a composite material or as an adhesive in an adhesive system. Without intending to be bound by a theory of the mechanism of the invention, it is believed that the ability of ungelatinized starch present in the potato peel product to gelatinize in the presence of the fiber and protein components of the potato peel product functions to provide a uniquely powerful bond with the substrate of the resulting composite. As a consequence, it is preferred that the potato peel product not be completely gelatinized (cooked) prior to its application as an adhesive or binder. Those of skill in the art will be capable of determining the level of pregelatinization of the starch component of the potato peel product which is detrimental to the binding properties of the product.

A potato peel product which comprises both gelatinized (pregelled) starch and ungelatinized (cookup) starch and which is characterized by particularly good adhesive and binding properties is potato peel waste such as is obtained directly from the process of steam peeling potatoes. The process of removing potato peels from the heart of the potato by steam cleaning functions to partially or completely gelatinize a layer of starch beneath the surface of the peel allowing for a more ready mechanical removal of the peel. The resulting potato peel product is characterized by both gelatinized and non-gelatinized starch and has particularly good adhesive and binding properties. Steam peeling such that a portion of the potato starch is precooked is typically practiced in the United States. By contrast, the potato starch is generally not precooked by peeling methods practiced in Europe.

The potato peel product also comprises fiber which is primarily (generally 60% or more of the fiber) hemicellulose fiber but which also comprises cellulose, digestible fiber and non-digestible fiber. The potato peel product also comprises protein. The potato peel product also comprises ash which is the mineral content of the product. When the potato peel product is obtained directly as the product of steam peeling it is referred to as "potato peel waste." Potato peel waste products from commercial processes were characterized by a composition such as that set out in Table 1 below.

Table 1 also discloses analyses of two potato peel products which consist of the product of potato peel waste produced by steam peeling combined with potato trim waste produced by other potato processing operations. Because potato trim waste typically comprises trimmings from the starchy potato heart, potato peel products including potato trim waste typically comprise relatively more starch and relatively less protein and fiber than potato peel products derived exclusively from steam peeled potato peel waste. Further, when the potato trim waste includes recycled trimmings from the potato frying, the oil content of the potato peel product will be relatively higher. Further, to the extent that the potato starch is gelatinized during frying, the ratio of ungelatinized to gelatinized starch in the potato peel product will be decreased. The inclusion of oil and increased levels of gelatinized starch into the potato peel product can be tolerated provided that the level of neither reaches so high that it interferes with the adhesive and binding properties of the product. It would be well within the skill of those in the art to determine such levels. In addition, the potato peel products of the present invention can also comprise "culls" which are intact small potatoes and potato pieces that typically are included in waste streams.

TABLE 1

| Components | Potato Peel Waste | Peel and Trim | Peel and Trim |
| --- | --- | --- | --- |
| Moisture | 9.89% | 9.33% | 5.74% |
| Crude Fiber | 7.80 g | 3.95 g | 3.31 g |
| Ash | 9.24 g | 4.16 g | 4.93 g |
| Sugars | 2.73 g | <0.50 g | 0.94 g |
| Carbohydrates | 62.15 g | 69.5 g | 71.8 g |
| Fat | 0.38 g | 7.00 g | 5.72 g |
| Protein | 18.34 g | 10.01 g | 12.19 g |
| % Pregelled Starch | 11.9% | 21.8% | ~20% |

While there exist plentiful sources of potato peel products in the form of potato peel waste, it will be recognized that the adhesives and binders of the invention may be produced using potato peel products derived from other sources including the processing of potato peels and potato starch specifically for the purpose of practicing the present invention. Thus, the protein, fiber and ash making up the potato peel can be isolated separately from gelatinized and ungelatinized potato starch which can then be combined to produce the potato peel products of the invention.

The potato peel products of the invention are contemplated to be particularly useful as adhesives and binders in a variety of applications. When used as binders in non-edible composites the potato peel products of the invention may be combined with mineral and non-mineral substrates including but not limited to calcium carbonate, wood particles, wood fiber, paper fiber, pressed wood, plywood, gypsum board, acoustical tile, low-grade wallboard and the like. The concentrations of peel products will vary according to the degree of adhesiveness that is required as well as the durability of the final product. The potato peel products of the invention may be substituted for starch in non-edible composites at solids concentrations equivalent to or even less than those of the starch binder used conventionally despite the fact that the starch proportion of the potato peel product is typically less than half that of the conventional binder. Moreover, the structural and functional properties of the resulting product are equivalent to or superior to those using conventional starch or other materials as binders.

It is contemplated that the potato peel products of the invention will prove particularly useful as binders in materials such as gypsum wall board, acoustical tile, particle board and packaging materials. When used in these products, the potato peel materials of the invention will act as binders bonding together the components of the final product.

According to one aspect of the invention, it has been found that potato peel products are particularly useful binders in packaging materials and containers comprising highly inorganically filled materials such as those disclosed in Anderson et al., U.S. Pat. No. 5,385,764 and Anderson et al., U.S. Pat. No. 5,545,450 the disclosures of which are hereby incorporated by reference. These patents disclose environmentally desirable packaging containers having the ability to degrade after prolonged exposure to water. Containers comprising such packaging materials may be used to package food including fast food and comprise a matrix reinforced with fibers, the matrix comprising a substantially homogeneous mixture of aggregate and organic binder which is formed by the evaporation of water from an inorganically filled mixture including water; a water disposable organic polymer binder which can be starch; an inorganic aggregate which can be clay, gypsum perlite, vermiculite, sand, glass and the like; and a fibrous material. Structural composites using the potato peel products of the invention also include plates, cups and bowls that can be combined with other bio-polymers or synthetic polymers. Potato peel products can also be used for such eating utensils as forks, knives, spoons and the like.

The potato peel products of the present invention may also be used as adhesives for paper and paperboard and as architectural adhesives such as for wallpaper, tiling and paneling adhesives. The potato peel products may also be used as adhesives in the production of architectural laminates including but not limited to plywood and decorative laminates and paneling. A particularly useful adhesive composition is that comprising a potato peel product in combination with borax and caustic. The proportion of potato peel waste can be as high as 97% of the total dry weight with caustic and borax making up the remainder. Such adhesive compositions are particularly useful as corrugating adhesives for use with paper and paperboard. The corrugating adhesives of the invention are useful for adhering both uncoated and coated paper. The potato peel products of the invention are also useful as components of adhesive compositions for the tape and envelope trade. The potato peel products can be used in combination with and to replace portions of dextrins, proteins and highly modified starches that are usually components of such tape and envelope adhesives.

The potato peel products of the invention are also useful for use as binders in composite food products comprising an edible substrate and a binder. The potato peel products of the invention are nutritious and provide excellent binding properties to composite food products and are substantially less expensive than other food grade binder materials such as gums and modified food starches. Suitable composite food products which can be produced according to the invention include meat analogues such as vegetable burger patties which can comprise soy protein as the substrate. Other composite food products which can comprise the potato peel products of the invention as binders include vegetable analogues and composite meat products including such products as sausage and surimi. A particularly surprising use is for binding fat and water together in meat based sauces.

The following examples are presented to more clearly illustrate the invention. Examples 1 and 2 describe the use of a potato peel product as a corrugating adhesive for adhering paper. Example 3 describes the effect of pH on corrugating adhesives. Example 4 describes the substitution of a potato peel product for a portion of the potato starch binder in a disposable "clamshell" food container. Example 5 describes the use of a potato peel product as a binder in vegetable "burger" patties and Example 6 describes the use of a potato peel product as a binder in a meat sauce. Example 7 describes the preparation of oxidized and cationic potato peel products of the invention while Example 8 presents a comparison of the physical properties of the various potato peel products.

EXAMPLE 1

According to this example, the potato peel product of the invention was used as a corrugating adhesive. Conventional corrugating adhesives comprise pearl corn starch or a low oxidized dent corn starch such as Douglas 3018 Corrugating Starch (Penford Corporation, Cedar Rapids, Iowa) combined with caustic and borax. The basic adhesive formula has approximately 20% commercial solids and contains the common additives caustic (sodium hydroxide) and borax. The preparation of the adhesive consists of heating an aqueous suspension of starch in the presence of caustic for the carrier portion, and later adding this to a mixture of the raw starch portion and borax in additional water. The corrugating adhesive is unique in that it has little tack in its prepared form but is cooked in situ after being applied. By the application of heat, a combination of physical and chemical changes occur which result in an almost instantaneous increase in viscosity and setting up of the adhesive.

Specifically, potato peel waste obtained from the steam peeling of potatoes and having 9% moisture was used in place of either a low oxidized dent corn starch (Douglas 3018) or a high amylose corn starch (Hylon®) in the formula set out in Table 2 below:

TABLE 2

| Component | Control Adhesive (gm) | Potato Peel Adhesive (gm) |
|---|---|---|
| Starch | 16 | — |
| Potato Peel Product (1st addn.) | — | 84.5 |
| Water | 92 | 21.6 |
| Caustic (50% NaOH) | 7 | 7 |
| Water | 80 | 80 |
| Borax | 4 | 4 |
| Starch (12% $H_2O$) | 16 | — |
| Potato Peel Product (2nd addn.) | — | 84.5 |
| Water | 75 | 5 |

The adhesives are prepared according to a conventional procedure. Water is added to the first addition of peel waste. With mixing, the mixture is heated to 120° F. at which point caustic is added and the mixture is further heated to 140° F. Water is then added with strong agitation for at least 5 minutes followed by the addition of borax and the final addition of peel waste. The entire adhesive mixture is maintained at approximately 120° F. with strong agitation for at least 5 minutes before use. (Occasionally in a commercial setting, water may be added at the very end of the formulation in order to enhance the flow of the adhesive mixture. Our formulation work did not do this.) According to our invention, the potato peel product is first ground to a mesh size of 100% through a U.S. Standard No. 60 mesh.

The resulting corrugating adhesives were then applied by a gravure roll to uncoated light, medium and heavy paper sheets characterized by basis weight of 5.3, 6.7 and 14.1 pounds per standard ream and previously coated board which were bonded together. The resulting sheets were dried overnight and subjected to a Scott Bond Test using a Huygen AV-2 digitized internal bond tested under conditions of controlled temperature and humidity. The results of the testing, which measures force in foot pounds required to break the adhesive bond, are presented in Table 3 below. A "no adhesive" control was provided in which the adhesiveness of the Scott Bond tester standard adhesive paper control served as an instrument control.

TABLE 3

(Internal Bond Strength (foot pounds × 1000))
Adhesive Composition

| Paper Weight | No Adhesive (Control) | Douglas 3018 Starch 16% Solids | Hylon ® High Amylose Starch 16% Solids | Peel Product 7% Solids | Peel Product 10% Solids | Peel Product 16% Solids |
|---|---|---|---|---|---|---|
| Light Weight | 139 | 147 | 175 | 99 | 108 | 151 |
| Medium Weight | 96 | 142 | 145 | 132 | 121 | 133 |
| Heavy Weight | 175 | 205 | 183 | 120 | 142 | 172 |
| Coated Board | — | 93 | 158 | 146 | — | — |

The results presented in Table 3 show that corrugating adhesive comprising the potato peel products of the invention provided an adhesive bond comparable to those provided by commercially available corrugating starches.

EXAMPLE 2

According to this example, the potato peel waste product of the invention was used as a corrugating adhesive according to the general method of Example 1. Specifically, potato peel waste (9% moisture) which was ground to a size wherein 100% passed through a U.S. Standard No. 60 mesh and was used in place of a conventional corrugating starch according to the formulation of Table 4 below: The formulation of Table 4 was then modified by the substitution of starches for potato peel waste at either or both of the "carrier" starch portion or the "raw" starch portion as set out in Table 5.

TABLE 4

| Component | Potato Peel Adhesive (gm) |
|---|---|
| Starch | — |
| Potato Peel Product (1st addn.) | 84.5* |
| Water | 21.6 |
| Caustic (50% NaOH) | 7 |
| Water | 80 |
| Borax | 4 |
| Starch (12% H$_2$O) | — |
| Potato Peel Product (2nd addn.) | 84.5 |
| Water | 5 |

*All of initial water (21.6 gm plus 80 gm) used to slurry first portion of peel product.

The adhesives were prepared according to the conventional procedure of Example 1 and were applied by gravure roll to lightweight and medium weight paper sheets characterized by basis weights of 5.3 and 6.7 pounds per standard ream respectively which were bonded together with a hot iron at its highest heat setting for 10 seconds to gelatinize the cook-up starch in the compositions. After ironing, some of the sheets were sampled to determine "Green bond" strength which is reported in Table 5 below. The remaining bonded sheets were then pressed under a weight for four hours and allowed to dry overnight at 105° F. and subjected to a Scott Bond Test using a Huygen AV-2 digitized internal bond tester under conditions of controlled temperature and humidity. The results of the testing are presented in Table 5 below.

TABLE 5

| Exp. No. | | Scott Bond (foot lbs × 1000) | | Green Bond |
|---|---|---|---|---|
| | | Lt. Wt. | Med. Wt. | |
| 2A | Raw = 10% Starch (16.7% solids total) + 90% PW | 281 | 242 | L |
| 2B | Raw = 2% Starch (16.7% solids total) + 98% PW | 294 | 232 | L |
| 2C | Raw = 2% Starch (12% solids total) + 98% PW | 346 | 243 | H |
| 2D | Raw = 5% Starch (12% solids total) + 95% PW | 290 | 243 | VH |
| 2E | Raw = 15% Starch (12% solids total) + 85% PW | 283 | 228 | VH |
| 2F | Raw = 50% Starch + 50% PW Carrier = 50% Starch (12% solids total) + 50% PW | 386 | 229 | VH |
| 2G | Carrier = 50% Starch (12% solids total) + 50% PW | 323 | 242 | VVH |
| 2H (Control) | 100% Douglas Starch (oxidized) (12% solids total) | 402 | 243 | H |
| 2I (Control) | 100% Pearl Starch (12% solids total) | 408 | 285 | M |
| 2J | All Peel Product no heat (12% solids total) | 280 | 188 | VH |
| 2K | Raw = 95% Pearl Starch + 5% PW (12% solids total) Carrier = 5% Pearl Starch + 95% PW | 171 | 250 | VH |
| 2L | Douglas w/(12% solids total) | 260 | 244 | H |
| 2M | All Peel Product normal w/heat (12% solids total) | 302 | 194 | L |

L = low, M = medium, H = high, VH = very high, VVH = very, very high, PW = Potato Peel Product.

EXAMPLE 3

According to this example, the effect of pH on corrugating adhesives comprising peel waste was determined. While conventional starch-containing corrugating adhesives generally require a high pH to provide good binding properties such a high pH can interfere with printing on the corrugated products. According to this example, the level of NaOH was reduced in producing corrugating adhesives otherwise having the formula of Table 2 above but wherein ground peel waste was substituted for 100% of the starch. The results in Table 6 show that as the pH was lowered from 11.5 to 7.5, strength as measured by Scott Bond dropped significantly for the starch control while the corrugating adhesive comprising peel waste retained significant strength at the lower pH's.

TABLE 6

| | Starch (Control) Scott Bond (foot lbs × 1000) | | Peel Waste Scott Bond (foot lbs × 1000) | |
|---|---|---|---|---|
| pH | Lt. Wt. | Med. Wt. | Lt. Wt. | Med. Wt. |
| 11.5 | 117 | 122 | 229 | 129 |
| 9.4 | 181 | 110 | 220 | 129 |
| 7.5 | 78 | 100 | 159 | 124 |

EXAMPLE 4

According to this example the potato peel waste product of the invention was used as a binder in a disposable "clamshell" container such as used for packaging of cooked hamburgers. Specifically, potato peel waste obtained from the steam peeling of potatoes was substituted for proportions of the potato starch component of a composite packaging composition. The control and test formulas are set out in Table 8 below.

According to a conventional procedure, two pre-mixtures of materials were prepared. The first premixture was prepared by combining water, wood fiber recycled from paper, bleached fiber, calcium carbonate and unmodified ungelatinized (cookup) potato starch (Pencook 10, Penford Corporation) were combined in a mixer (Hobart) for four to six minutes on a high setting. The blended mixture was then heated in a microwave oven to a temperature of 80–90° C. in order to gelatinize the starch. The mixture was then mixed for six minutes and allowed to cool below the gelatinization temperature of the starch. The second premixture was then added to the first premixture. The second premixture comprised water, guar gum, unmodified ungelatinized (cookup) potato starch (Pencook 10, Penford Corporation) and magnesium stearate. The combined premixtures were then combined in a mixer (Hobart) for six to ten minutes.

The mixture was then applied to a mold and cooked at 200° C. for 50 to 60 seconds under conditions which gelatinized the starch component of the composite to produce a solid "clamshell" package.

Composite packaging materials according to the invention were produced by substitution of potato peel product for proportions of the potato starch component in either the first or the second premixtures. For sample 4B in Table 7, potato peel products were added on a starch basis to replace 20% of the starch used in premix 1. Since the starch content of the potato peel waste used in this experiment was 20% by weight, 300 grams of potato peel was needed to replace 60 grams of potato starch. In sample 4C, where the potato peel waste products were added to premix 2, potato peel waste was added on a weight for weight substitution for potato starch. Solid clamshell packages were prepared according to the same method used for the conventional control (4A).

The resulting clamshell packages were then evaluated for appearance and smell and total weight and found to be acceptable. The packages were also tested for burst strength using a Mullen test with the results shown in Table 7.

TABLE 7

| Run | 4A (Control) | 4B | 4C |
|---|---|---|---|
| Premix 1 (gms) | | | |
| Water | 3000 | 3400 | 3000 |
| Recycled Fiber | 108 | 108 | 108 |

TABLE 7-continued

| Run | 4A (Control) | 4B | 4C |
|---|---|---|---|
| CaCO$_3$ | 1103 | 1103 | 1103 |
| Bleached Fiber | 252 | 252 | 252 |
| Potato Starch | 300 | 240 | 300 |
| Potato Peel Product | — | 300 | — |
| Premix 2 (gms) | | | |
| Water | 1695 | 1695 | 1695 |
| Guar Gum | 30 | 30 | 30 |
| Mg Stearate | 60 | 60 | 60 |
| Potato Starch | 1748 | 1748 | 1448 |
| Potato Peel Product | — | — | 300 |
| Mullen Burst Strength (psi) | | | |
| Bottoms | 2.8 | 2.9 | 2.9 |
| Tops | 3.4 | 3.3 | 3.3 |

EXAMPLE 5

According to this example the potato peel product of the invention was used as a binder in the production of composite food product. Specifically, potato peel waste obtained from the steam peeling of potatoes was used as a binder in a hamburger beef patty analog also known as a "vegetable burger." In particular, the potato peel product was substituted for pregelled potato starch alone or pregelled potato starch in combination with xanthan gum used as binders in a conventional beef patty analogue. The control and test formulas are set out in Table 8 below.

The ingredients of Table 8 were dry mixed in a mixer (Hobart) and then blended with 200 mL of either purified water or peel waste filtrate comprising substantially water with minor amounts of potato peel waste components dissolved therein to form patties. For example, the formulation of runs 5A–5C and 5F–5I had 200 mL of water added to form patties. In runs 5D and 5E the water was replaced with 200 mL potato peel waste filtrate. The formula of run 5F was the same as that of run 5D except that the potato peel waste was subjected to grinding in a Waring blender with 100 mL of potato peel filtrate for two minutes. Additional water was added to total 120 mL of liquid. The patties were then baked at 350° F. for 15 minutes and evaluated visually for texture.

TABLE 9

| | Ingredients (gms) | | | | | | | | |
|---|---|---|---|---|---|---|---|---|---|
| | 5A | 5B | 5C | 5D | 5E | 5F | 5G | 5H | 5I |
| Full Fat Soy Flour | 350 | 350 | 200 | 175 | 200 | 200 | 200 | 200 | 200 |
| Vital Wheat Gluten | 75 | 75 | 25 | 37.5 | 25 | 25 | 25 | 25 | 25 |
| Sodium Caseinate | 25 | 25 | 12.5 | 12.5 | 12.5 | 12.5 | 12.5 | 17.5 | 22.5 |
| Pregelled Potato Starch | 50 | — | 10 | — | — | — | — | — | — |
| Xanthan Gum | — | — | 2.5 | — | — | — | — | — | — |
| Potato Peel Product | — | — | — | 25 | 12.5 | 12.5 | 12.5 | 7.5 | 2.5 |
| Total | 500 | 450 | 300 | 250 | 250 | 250 | 250 | 250 | 250 |

Runs 5A and 5C were control products using pregelled potato starch alone (5A) or in combination with xanthan gum (5C). These products showed good texture having relatively few large cracks in the cooked patties. In contrast, the patties not including a binder (5B) exhibited a large number of cracks and poor texture. The patties comprising a potato peel product as a binder (5D, 5E, 5F and 5G) exhibited good texture with relatively few large cracks and were comparable to suitable controls which contained gums and/or starches as the binder. Those products using a potato peel product at lower levels (5H and 5I) exhibited more cracks and less desirable texture properties. When a potato peel product is present at the proper percentage of formula weight, these results show that the potato peel products of the invention provide valuable binding properties to composite foods and in particular meat analogues.

EXAMPLE 6

According to this example, the potato peel product of the invention was used as a binder for fat and water in the production of a meat based seasoned sauce preparation for a fast food Mexican sauce. Test formulations are presented in Table 10 below in which dried potato peel waste derived from steam peeling of potatoes was used as a binder in the composite meat sauce composition. The test formulations were compared against control formulations comprising no binder (6A and 6B) and a formulation comprising a commercially available potato fiber formulation Potex® 31 which has a composition characterized by 12% starch, 5% protein and 70% dietary fiber (6F). The composition of the dried potato peel waste is presented in Table 12 below.

evaluation of the products was made with the results reported in Table 11 below. These results indicate that the use of the potato peel product of the invention as a binder for retaining fats, oils and water in a ground meat based commercial formulation shows a significant increase in the retention of these components when the formulation is completed. An additional unexpected result is that finished cooked meat weight increased by almost 30%. When these results are compared to the use of known commercially available potato fiber/starch combinations such as those of run 4F it appears that increases in retention of fats, oils, and water are also evident. Thus, the potato peel products of the invention can be used in place of a far more expensive fiber ingredient.

In addition, analysis of the moisture and oil content of the products showed that the control product without any binder

TABLE 10

| | \multicolumn{12}{c}{Formula} |
|---|---|---|---|---|---|---|---|---|---|---|---|---|
| | 6A | | 6B | | 6C | | 6D | | 6E | | 6F | |
| | Wt. (g) | % | Wt. (g) | % | Wt. (g) | % | Wt. (g) | % | Wt. (g) | % | Wt. (g) | % |
| Meat (ground beef: 80% beef/20% fat) | 908 | 68.35 | 908 | 68.35 | 908 | 64.94 | 908 | 61.52 | 908 | 66.99 | 908 | 66.99 |
| Water | 349.5 | 26.31 | 349.5 | 26.31 | 349.5 | 24.99 | 349.5 | 23.68 | 349.5 | 25.78 | 349.5 | 25.78 |
| Seasoning | 70.9 | 5.34 | 70.9 | 5.34 | 70.9 | 5.07 | 70.9 | 4.80 | 70.9 | 5.23 | 70.9 | 5.23 |
| Potato Dried Peel Waste | — | — | — | — | 69.92 | 5.00 | 147.6 | 10.00 | 27.01 | 2.00 | — | — |
| Potato Fiber (Potex ® 31) | — | — | — | — | — | — | — | — | — | — | 27.1 | 2.00 |
| Totals | 1,328.4 | 100 | 1,328.4 | 100 | 1,398.32 | 100 | 1,476.0 | 100 | 1,355.5 | 100 | 1,355.5 | 100 |

According to the example, the ground beef was browned in a steam-jacketed kettle for 3.5 minutes at 170–180° F., until no pink meat was observed. Water, seasoning and the potato peel product binder were added in that order, and were mixed and simmered for ten minutes. The seasoned meat was removed from the kettle and the cooked/liquid weight was recorded. The meat was then strained and the liquid weighed and recorded and a visual and sensory had a moisture content of 62.9% and an oil content of 26.6%. The sample containing 5% dried peel waste had a moisture content of 62.5% and an oil content of 28.1%. The sample containing 10% dried peel waste had a moisture content of 57.0% and an oil content of 30.3%. These values confirm the observations that in the presence of peel waste oil can be retained (bound) by the meat portion of the formulation even though moisture remains approximately the same.

TABLE 11

| | 6A | 6B | 6C | 6D | 6E | 6F |
|---|---|---|---|---|---|---|
| Cooked wt. with liquid (g) | 1030.70 | 1084.5 | 1210.86 | 1288.10 | 1139.1 | 1115.4 |
| Cooked yield with liquid (%) | 77.59 | 81.6 | 86.59 | 87.27 | 84.0 | 82.3 |
| Strained liquid wt. (g) | 146.80 | 180.0 | 70.07 | 10.81 | 74.4 | 74.0 |
| Strained liquid (%) | 14.24 | 61.7 | 5.79 | .84 | 6.5 | 6.6 |
| Cooked meat w/o liquid (g) | 833.90 | 903.5 | 1140.70 | 1277.29 | 1064.7 | 1041.4 |
| Cooked yield w/o liquid (%) | 66.54 | 68.0 | 81.58 | 86.54 | 78.6 | 76.8 |
| Cooked w/o liquid wt./green meat wt. | 97.35 | 99.5 | 125.63 | 140.67 | 117.3 | 114.7 |
| Moisture Content (%) | 62.9 | — | 62.5 | 57.0 | — | — |
| Oil Content (%) | 26.6 | — | 28.1 | 30.3 | — | — |
| Sensory/Visual | Typical Crumbly Cohesive | Typical Crumbly Cohesive | Less Crumbly Cohesive | Very Cohesive Paste Like | Fine Mushy Very Moist | Intermediate Texture Between 4B and 4E |

TABLE 12

Composition of Dried Potato Peel Product (Grams/100)

| | |
|---|---|
| Crude Fiber | 3.95 |
| Fat | 7.00 |
| Glucose | <0.5 |
| Lactose | <0.5 |
| Protein | 10.01 |
| Moisture | 9.33 |
| Ash | 4.16 |
| Carbohydrate (Total) | 69.5 |
| Fructose | <0.5 |
| Maltose | <0.5 |
| Sucrose | <0.5 |

EXAMPLE 7

According to this example, a dry potato peel product of the invention was oxidized by treatment with 0.9% chlorine overnight followed by a pH adjustment to 5.1 using diluted sulfuric acid.

Further, a potato peel product of the invention was subjected to cationic modification by treatment with a 65% quaternary-ammonium compound (Dow, Quat-188). The quaternary compound was applied at a 2% level based on starch weight at a pH of about 10.5 using a mixture of salt and caustic. After an overnight reaction, the pH was adjusted to 5.1 using concentrated sulfuric acid.

EXAMPLE 8

The oxidized and cationic potato products of Example 7 along with an unmodified potato peel product (control) were subjected to physical analysis by a Rapid Visco Analysis (RVA) apparatus (RVA Model No. 4, Newport Scientific, Warriewood NSW, Australia, 2102). According to the analytical method, a 30 gram sample of the product to be analyzed is slurried to a 15% solids level, as is at pH 5.1 and subjected to a heating cycle starting at 25° C., heating to 95° C., holding at 95° C., cooling to 25° C. and holding until finished.

The results of analysis of the oxidized, cationic and unmodified (control) potato peel products are illustrated in FIG. 1 which depicts the viscosity profiles of oxidized, cationic and unmodified (control) potato peel products along with the heating profile for the experiment. These results show that both cationic and oxidative modification of the potato peel product result in dramatic reductions of the viscosity profiles of the modified potato peel products. The results showing that cationic modification further reduces the overall viscosity compared to oxidation demonstrate that the cationic modification affects not only the starch component but also the cellulose and protein components of the potato peel product. By comparison, the profile for the unmodified potato peel product shows the effect of heat on the components of the peel product, hence the jagged plot, especially after heating the peel product. Modifying the potato peel product by oxidation or by cationic modification can therefore provide substantial improvements to the potato peel products.

Numerous modifications and variations of the above-described invention are expected to occur to those of skill in the art. Accordingly, one such limitations as appear in the appended claims should be appended thereon.

What is claimed:

1. A composite food product comprising an edible substrate and a binder wherein said binder comprises a potato peel product characterized on a dry solids basis by at least 30% starch, at least 5% protein and at least 2% fiber.

2. The composite food product of claim 1 wherein said potato peel product is prepared by steam peeling potatoes.

3. The composite food product of claim 1 wherein said food product is selected from the group consisting of meat analogues, vegetable analogues and composite meat products.

4. The composite food product of claim 1 wherein said food product is a meat analogue.

5. The composite food product of claim 4 wherein the edible substrate comprises soy protein.

6. The composite food product of claim 1 which is a meat sauce.

7. A method of producing a composite food product comprising combining an edible substrate and a binder wherein said binder comprises a potato peel product characterized on a dry solids basis by at least 30% starch wherein said starch is not completely gelatinized, at least 5% protein and at least 2% fiber to form a mixture; and heating said mixture under conditions selected to complete gelatinization of said starch.

8. A composite food product produced according to the method of claim 7.

\* \* \* \* \*

UNITED STATES PATENT AND TRADEMARK OFFICE
CERTIFICATE OF CORRECTION

PATENT NO.     : 6,524,639 B1
DATED          : February 25, 2002
INVENTOR(S)    : Rogols et al.

It is certified that error appears in the above-identified patent and that said Letters Patent is hereby corrected as shown below:

Title page,
Item [76], Inventors, please delete "Denise M. Sirovatka,
3360 W. 33$^{rd}$ Ave., Denver, CO (US) 80211;"

Column 12,
Line 44, after "TABLE," please delete "9" and insert -- 8 -- in its place.

Column 13,
Line 14, after "TABLE," please delete "10" and insert -- 9 -- in its place.
Line 21, after "TABLE," please delete "12" and insert -- 11 -- in its place.
Line 22, after "TABLE," please delete "10" and insert -- 9 -- in its place.

Column 14,
Line 2, after "TABLE," please delete "11" and insert -- 10 -- in its place.
Line 49, after "TABLE," please delete "11" and insert -- 10 -- in its place.

Column 15,
Line 2, after "TABLE," please delete "12" and insert -- 11 -- in its place.

Signed and Sealed this

Eighth Day of July, 2003

JAMES E. ROGAN
*Director of the United States Patent and Trademark Office*